US009289898B2

(12) United States Patent
Ono

(10) Patent No.: US 9,289,898 B2
(45) Date of Patent: Mar. 22, 2016

(54) HORIZONTAL MULTI-JOINT ROBOT AND ROBOT

(71) Applicant: Seiko Epson Corporation, Tokyo (JP)

(72) Inventor: Masatoshi Ono, Matsumoto (JP)

(73) Assignee: Seiko Epson Corporation (JP)

( * ) Notice: Subject to any disclaimer, the term of this patent is extended or adjusted under 35 U.S.C. 154(b) by 192 days.

(21) Appl. No.: 14/059,717

(22) Filed: Oct. 22, 2013

(65) Prior Publication Data

US 2014/0109712 A1  Apr. 24, 2014

(30) Foreign Application Priority Data

Oct. 23, 2012  (JP) ................................ 2012-233499

(51) Int. Cl.
*B25J 9/04* (2006.01)
*B25J 19/00* (2006.01)

(52) U.S. Cl.
CPC .............. *B25J 9/042* (2013.01); *B25J 19/0041* (2013.01); *Y10T 74/20311* (2015.01)

(58) Field of Classification Search
CPC .......... B25J 9/042; B25J 9/0041; B25J 9/043; B25J 9/04; B25J 9/0087; B25J 9/06; B25J 9/044; B25J 19/0025; B25J 19/00; B25J 19/0029; B25J 9/0009; B25J 9/106
USPC ............... 74/490.01, 490.03, 490.04, 490.05; 901/9, 14, 19
See application file for complete search history.

(56) References Cited

U.S. PATENT DOCUMENTS

| 4,699,563 | A | * | 10/1987 | Yokose | ....................... 414/744.5 |
| 4,754,663 | A | * | 7/1988 | Yasukawa | ................... 74/665 L |
| 4,767,257 | A | * | 8/1988 | Kato | .......................... 414/744.5 |
| 4,873,511 | A | * | 10/1989 | Tanaka | .......................... 340/677 |
| 5,201,630 | A | * | 4/1993 | Ishida et al. | ............... 414/744.5 |
| 5,205,701 | A | * | 4/1993 | Kigami et al. | ............. 414/744.5 |
| 6,439,076 | B1 | * | 8/2002 | Flemmer | ..................... 74/490.03 |
| 8,104,372 | B2 | * | 1/2012 | Meyerhoff et al. | ........ 74/490.01 |
| 8,201,472 | B2 | * | 6/2012 | Feng | .......................... 74/490.01 |
| 8,327,531 | B2 | * | 12/2012 | Ono et al. | ....................... 29/783 |

(Continued)

FOREIGN PATENT DOCUMENTS

| JP | 08-057793 | 3/1996 |
| JP | 2007-237316 A | 9/2007 |

(Continued)

OTHER PUBLICATIONS

Extended European Search Report for Application No. EP 13 18 9484 dated Feb. 24, 2014 (6 pages).

*Primary Examiner* — William Kelleher
*Assistant Examiner* — Jude Agendia
(74) *Attorney, Agent, or Firm* — Harness, Dickey & Pierce, P.L.C.

(57) ABSTRACT

A horizontal multi-joint robot includes: a first joint capable of swiveling around a first axis; a second joint capable of swiveling around a second axis that is parallel to and spaced apart from the first axis; and a duct connected between the first joint and the second joint. The first joint has a first connecting portion forming a predetermined angle relative to the first axis. The second joint has a second connecting portion forming a predetermined angle relative to the second axis. The duct has a first end and a second end. The first end is connected to the first connecting portion. The second end is connected to the second connecting portion.

13 Claims, 5 Drawing Sheets

(56) References Cited

U.S. PATENT DOCUMENTS

2005/0087034 A1* 4/2005 Friedrich et al. .......... 74/490.03
2010/0050806 A1 3/2010 Ono et al.
2012/0279341 A1 11/2012 Ono et al.

FOREIGN PATENT DOCUMENTS

| JP | 2009-226567 A | 10/2009 |
| JP | 2010-058180 A | 3/2010 |
| JP | 2010-142905 A | 7/2010 |

* cited by examiner

HORIZONTAL MULTI-JOINT ROBOT AND ROBOT

BACKGROUND

1. Technical Field

The present invention relates to a horizontal multi-joint robot and a robot.

2. Related Art

JP-A-2009-226567 describes a horizontal multi-joint robot (SCARA robot) according to the related art. The horizontal multi-joint robot described in JP-A-2009-226567 has a pedestal, a first arm mounted on the pedestal so that the first arm can swivel (i.e., turn, rotate or pivot), a second arm mounted on the first arm so that the second arm can swivel, a work head mounted on the second arm, and a harness (duct) with one side thereof mounted on the pedestal and the other side thereof mounted on the second arm. Wires and pipes connected to a second arm drive motor and a work head drive motor are housed inside the harness. Such a horizontal multi-joint robot of JP-A-2009-226567 has, for example, the following two problems.

The first problem is that driving of the horizontal multi-joint robot causes the harness to shake and thus generates unwanted vibration. Specifically, in the horizontal multi-joint robot of JP-A-2009-226567, the root of the harness on the pedestal side is shifted from the axis of the first arm and the root of the harness on the second arm side is shifted from the axis of the second arm. Therefore, when the first and second arms swivel, the distance between both roots of the harness changes and this change causes the harness to deform and vibrate unnecessarily. Also, the swiveling of the first and second arms causes the harness to twist and vibrate unnecessarily. Such unnecessary vibration of the harness causes deterioration in the vibration damping of the horizontal multi-joint robot (increases the time required for the vibration to subside to a predetermined magnitude).

The second problem is that the horizontal multi-joint robot is increased in size. Specifically, the harness has a large height since both ends of the harness extend directly upward so as to coincide with the axes of the first and second arms. Therefore, a large space is required to place the harness which increases the size of the horizontal multi-joint robot.

SUMMARY

An advantage of some aspects of the invention is that a horizontal multi-joint robot and a robot in which vibration of the duct at the time of driving can be restrained and the installation space of the duct can be reduced.

An aspect of the disclosure is directed to a horizontal multi-joint robot including: a first joint capable of swiveling around a first axis; a second joint capable of swiveling around a second axis that is parallel to the first axis and spaced apart from the first axis; and a duct connected to the first joint and the second joint. The first joint is provided with a first connecting portion forming a predetermined angle relative to the first axis. The second joint is provided with a second connecting portion forming a predetermined angle relative to the second axis. The duct has a first end and a second end. The first end is connected to the first connecting portion. The second end is connected to the second connecting portion.

With this configuration, a horizontal multi-joint robot is provided in which vibration of the duct at the time of driving can be restrained and the installation space of the duct can be reduced.

In the horizontal multi-joint robot of the aspect of the disclosure, it is preferable that the first connecting portion is inclined toward the second axis and that the second connecting portion is inclined toward the first axis.

With this configuration, the total length of the duct can be reduced and the curvature of the duct can be restrained to a small value. Therefore, vibration of the duct at the time when the first and second arms are driven or when the driving is stopped can be prevented or restrained.

In the horizontal multi-joint robot of the aspect of the disclosure, it is preferable that a duct connecting portion of the first joint and a duct connecting portion of the second joint are provided within the same plane as the normals of the first axis and the second axis.

With this configuration, the curvature of the duct can be made substantially constant along the axial direction. That is, the concentration of a bending stress on a predetermined part of the duct can be prevented or restrained.

In the horizontal multi-joint robot of the aspect of the disclosure, it is preferable that, if a center axis of the first connecting portion is a third axis, a center axis of the second connecting portion is a fourth axis, an angle formed by the third axis and the first axis is $\theta 1$, and an angle formed by the fourth axis and the second axis is $\theta 2$, a relation of $\theta 1 = \theta 2$ is satisfied.

With this configuration, the curvature of the duct can be made substantially constant along the axial direction. That is, the concentration of a bending stress on a predetermined part of the duct can be prevented or restrained.

In the horizontal multi-joint robot of the aspect of the disclosure, it is preferable that, if a center axis of the first connecting portion is a third axis, a center axis of the second connecting portion is a fourth axis, an angle formed by the third axis and the first axis is $\theta 1$, and an angle formed by the fourth axis and the second axis is $\theta 2$, each of the angles $\theta 1$ and $\theta 2$ is 10° or greater and 60° or smaller.

With this configuration, the maximum height of the duct can be restrained and flexure of the first and second joints can also be restrained. Therefore, the curvature of wires within the first and second joints can be reduced and a bending stress applied to the wires can be reduced.

In the horizontal multi-joint robot of the aspect of the disclosure, it is preferable that the first joint and the second joint have the same shape and size.

Thus, the device design is simplified.

In the horizontal multi-joint robot of the aspect of the disclosure, it is preferable that, if a center axis of the first connecting portion is a third axis, and the center axis of the second connecting portion is a fourth axis, the duct extends along a circle having both the third axis and the fourth axis as tangents.

With this configuration, since an equal bending stress is applied to substantially the entire area of the duct, local concentration of stress on a predetermined part of the duct can be securely prevented.

In the horizontal multi-joint robot of the aspect of the disclosure, it is preferable that, if a distance between the first axis and the second axis is L, an average radius of curvature R of the duct satisfies a relation of $0.6L \leq R \leq L$.

With this configuration, excessive flexure of the duct is restrained. Therefore, the bending strength required of the duct can be lowered and, for example, a reduction in the weight of the duct due to a reduced thickness or the like can be realized.

In the horizontal multi-joint robot of the aspect of the disclosure, it is preferable that, if a distance between the first axis and the second axis is L, a relation of 100 mm≤L≤2000 mm is satisfied.

With this configuration, the total length of the duct can be restrained and the curvature of the duct can also be reduced. Moreover, the duct can be effectively reduced in weight.

Another aspect of the disclosure is directed to a robot including: a pedestal; a first arm connected to the pedestal and capable of swiveling around a first axis in relation to the pedestal; a second arm connected to the first arm and capable of swiveling around a second axis that is parallel to the first axis and spaced apart from the first axis, in relation to the first arm; and a wiring section which accommodates a wire therein and conveys the wire from the second arm to the pedestal. The wiring section includes: a duct supporting portion provided to protrude from the pedestal and intersect with the first axis; a first joint connected to the duct supporting portion and capable of swiveling around the first axis in relation to the duct supporting portion; a second joint connected to the second arm and capable of swiveling around the second axis in relation to the second arm; and a duct connected to the first joint and the second joint. The first joint is provided with a first connecting portion forming a predetermined angle relative to the first axis. The second joint is provided with a second connecting portion forming a predetermined angle relative to the second axis. The duct has a first end and a second end. The first end is connected to the first connecting portion. The second end is connected to the second connecting portion.

With this configuration, a robot is provided in which vibration of the duct at the time of driving can be restrained and the installation space of the duct can be reduced.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a preferred embodiment of a horizontal multi-joint robot and a robot will be described in detail with reference to the drawings.

Horizontal Multi-Joint Robot

First, a horizontal multi-joint robot will be described.

Figure 1:
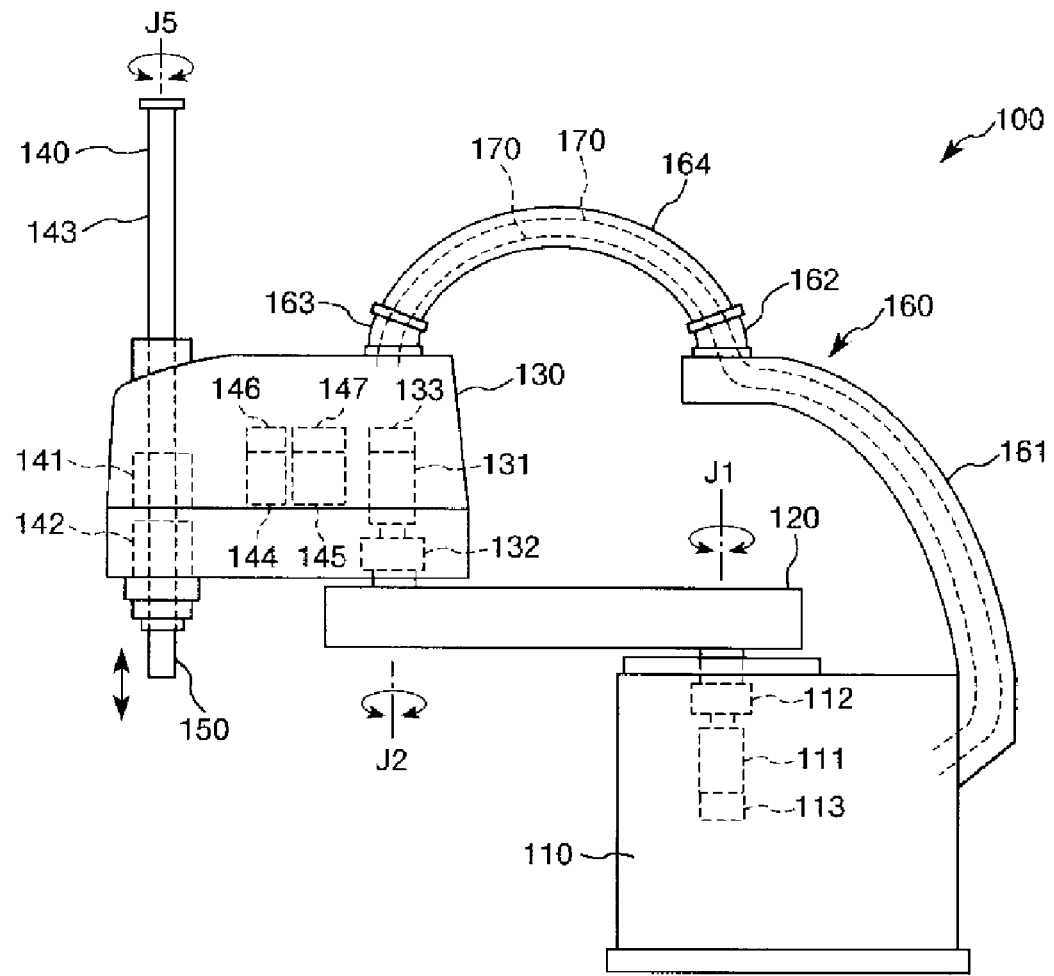
FIG. 1 is a view showing a preferred embodiment of a horizontal multi-joint robot.
Figure 2:
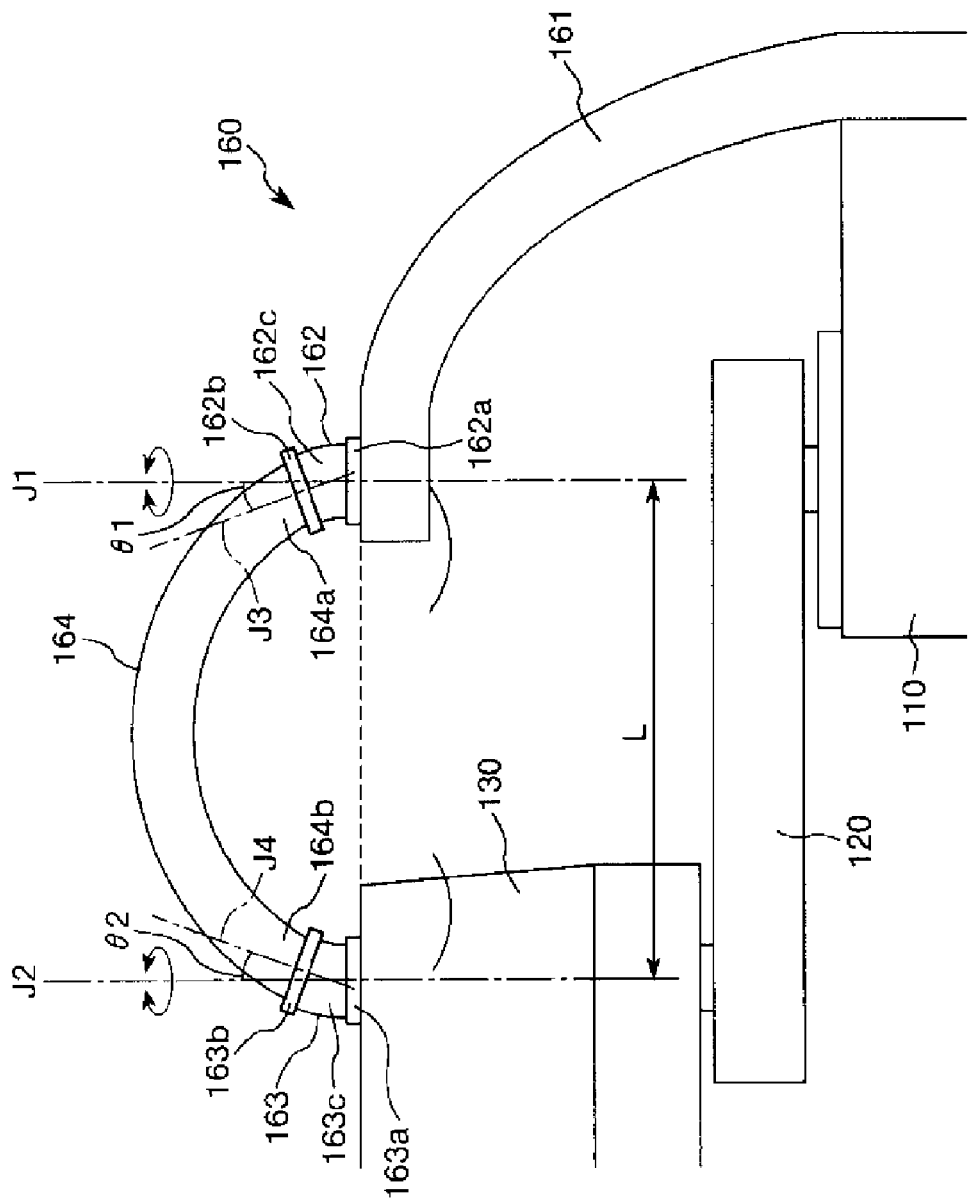
FIG. 2 is an enlarged sectional view of a wiring section provided in the horizontal multi-joint robot shown in FIG. 1.

FIG. 1 is a view showing a preferred embodiment of a horizontal multi-joint robot. FIG. 2 is an enlarged sectional view of a wiring section provided in the horizontal multi-joint robot shown in FIG. 1.

As shown in FIG. 1, a horizontal multi-joint robot (SCARA robot: horizontal multi-joint robot) 100 has a pedestal 110, a first arm 120, a second arm 130, a work head 140, an end effector 150, and a wiring section 160. The horizontal multi-joint robot 100 is a representative example of a horizontal multi-joint robot and also a robot.

The pedestal 110 is fixed, for example, to a floor surface, not shown, with bolts or the like. The first arm 120 is connected to an upper end of the pedestal 110. The first arm 120 is capable of swiveling around a first axis J1 that extends along a vertical direction, in relation to the pedestal 110.

Inside the pedestal 110, a first motor 111 which causes the first arm 120 to swivel, and a first decelerator 112 are installed. An input axis of the first decelerator 112 is connected to a rotation axis of the first motor 111. An output axis of the first decelerator 112 is connected to the first arm 120. Therefore, when the first motor 111 is driven and a driving force thereof is transmitted to the first arm 120 via the first decelerator 112, the first arm 120 swivels within a horizontal plane around the first axis J1 in relation to the pedestal 110. The first motor 111 is provided with a first encoder 113 which outputs a pulse signal corresponding to the amount of rotation of the first motor 111. Based on the pulse signal from the first encoder 113, driving (amount of swiveling) of the first arm 120 in relation to the pedestal 110 can be detected.

The second arm 130 is connected to a distal end of the first arm 120. The second arm 130 is capable of swiveling around a second axis J2 that extends along a vertical direction, in relation to the first arm 120.

Inside the second arm 130, a second motor 131 which causes the second arm 130 to swivel, and a second decelerator 132 are installed. An input axis of the second decelerator 132 is connected to a rotation axis of the second motor 131. An output axis of the second decelerator 132 is connected and fixed to the first arm 120. Therefore, when the second motor 131 is driven the a driving force thereof is transmitted to the first arm 120 via the second decelerator 132, the second arm 130 swivels within a horizontal plane around the second axis J2 in relation to the first arm 120. The second motor 131 is provided with a second encoder 133 which outputs a pulse signal corresponding to the amount of rotation of the second motor 131. Based on the pulse signal from the second encoder 133, driving (amount of swiveling) of the second arm 130 in relation to the first arm 120 can be detected.

The work head 140 is arranged at a distal end of the second arm 130. The work head 140 has a spline nut 141 and a ball screw nut 142 that are coaxially arranged at the distal end of the second arm 130, and a spline shaft 143 inserted in the spline nut 141 and the ball screw nut 142. The spline shaft 143 is rotatable around its axis in relation to the second arm 130 and also capable of moving up and down (ascent and descent).

Inside the second arm 130, a rotation motor 144 and a lift motor 145 are arranged. A driving force of the rotation motor 144 is transmitted to the spline nut 141 by a driving force transmission mechanism, not shown. As the spline nut 141 rotates forward and backward, the spline shaft 143 rotates forward and backward around an axis J5 that extends along a vertical direction. The rotation motor 144 is provided with a third encoder 146 which outputs a pulse signal corresponding to the amount of rotation of the rotation motor 144. Based on the pulse signal from the third encoder 146, the amount of rotation of the spline shaft 143 in relation to the second arm 130 can be detected.

A driving force of the lift motor 145 is transmitted to the ball screw nut 142 by a driving force transmission mechanism, not shown. As the ball screw nut 142 rotates forward and backward, the spline shaft 143 moves up and down. The lift motor 145 is provided with a fourth encoder 147 which outputs a pulse signal corresponding to the amount of rotation of the lift motor 145. Based on the pulse signal from the fourth encoder 147, the amount of movement of the spline shaft 143 in relation to the second arm 130 can be detected.

The end effector 150 is connected to a distal end (lower end) of the spline shaft 143. The end effector 150 is not particularly limited and may include, for example, a unit which holds an object to be carried, a unit which processes an object to be processed, or the like.

Plural wires 170 connected to individual electronic components (for example, the second motor 131, the rotation motor 144, the lift motor 145, the second, third and fourth encoders 133, 146, 147 and the like) arranged inside the second arm 130 pass through the pipe-like wiring section 160 connecting the second arm 130 and the pedestal 110 to each other and are drawn into the pedestal 110. Moreover, the plural wires 170 are bundled inside the pedestal 110 and thus drawn up to a control device, not shown, which is installed outside the pedestal 110 and generally controls the horizontal multi-joint robot 100, along with the wires connected to the first motor 111 and the first encoder 113.

Since the wires 170 of the individual electronic components inside the second arm 130 are thus drawn into the pedestal 110 via the wiring section 160, no space for drawing the wires 170 needs to be secured within the pedestal 110, the first arm 120 and the second arm 130. Also, for example, the second motor 131 and the second decelerator 132 need not be hollow in order to draw the wires 170 from the second arm 130 to the first arm 120, and an increase in the size of the second motor 131 and the second decelerator 132 is restrained. Similarly, for example, the first motor 111 and the first decelerator 112 need not be hollow in order to draw the wires 170 from the first arm 120 to the pedestal 110, and an increase in the size of the first motor 111 and the first decelerator 112 is restrained. Therefore, the pedestal 110, the first arm 120, and the second arm 130 can be reduced in size. Also, the total weight of the pedestal 110, the first arm 120, and the second arm 130 (the weight including each internal device) can be restrained. Therefore, a reduction in the size and weight of the horizontal multi-joint robot 100 can be realized.

As shown in FIG. 1 and FIG. 2, the wiring section 160 has a duct supporting portion 161, a first joint 162, a second joint 163, and a duct 164. These components are connected in the order of the duct supporting portion 161, the first joint 162, the duct 164, and the second joint 163, from the side of the pedestal 110. A wire insertion hole which connects the insides of the pedestal 110 and the second arm 130 to each other is formed within the wiring section 160. That is, the duct supporting portion 161, the first joint 162, the second joint 163, and the duct 164 are all pipe-shaped and have open inner spaces thereof connected in series.

The duct supporting portion 161 protrudes from a rear part on a lateral side of the pedestal 110 and extends with a gentle curve up above the pedestal 110. Also, the duct supporting portion 161 is arranged so that an upper edge of a distal end of the duct supporting portion 161 is substantially at the same height as an upper end of the second arm 130. The duct supporting portion 161 is rigid and does not substantially flex or deform.

The first joint 162 is connected to and received by a bearing at the distal end of the duct supporting portion 161 and is capable of swiveling around the first axis J1 in relation to the duct supporting portion 161. Meanwhile, the second joint 163 is connected to and received by a bearing at a proximal end and upper end of the second arm 130 and is capable of swiveling around the second axis J2 in relation to the second arm 130.

In this manner, in the horizontal multi-joint robot 100, the axis of the first joint 162 coincides with the axis of the first arm 120, and the axis of the second joint 163 coincides with the axis of the second arm 130. Therefore, no matter how each of the first and second arms 120, 130 is driven, an inter-axis distance between the axes of the first and second joints 162, 163 is kept constant. Therefore, deformation (expansion or contraction) of the duct 164 connected to the first and second joints 162, 163 is prevented or restrained. Consequently, vibration of the duct 164 at the time when the first and second arms 120, 130 are driven or when the driving is stopped can be prevented or restrained, and vibration of the second arm 130 can be reduced accordingly.

The first joint 162 is bent or curved in the middle in the extending direction. Therefore, it can be said that the first joint 162 has a duct supporting portion connecting portion 162a connected to the duct supporting portion 161, a duct connecting portion (first connecting portion) 162b connected to the duct 164, and a curved portion 162c which is situated between the duct supporting portion connecting portion 162a and the duct connecting portion 162b and connects these portions at a predetermined angle. The duct supporting portion connecting portion 162a is provided along a vertical direction, and a center axis thereof coincides with the first axis J1. Meanwhile, the duct connecting portion 162b is provided so that a portion of a center axis thereof (third axis) J3 overlapping the duct 164 is inclined toward the second joint 163 in relation to the first axis J1.

The second joint 163 has the same shape and size as the first joint 162. That is, the second joint 163 is bent or curved in the middle in the extending direction and has an arm connecting portion 163a connected to the second arm 130, a duct connecting portion (second connecting portion) 163b connected to the duct 164, and a curved portion 163c which is situated between the arm connecting portion 163a and the duct connecting portion 163b and connects these portions at a predetermined angle. The arm connecting portion 163a is provided along a vertical direction, and a center axis thereof coincides with the second axis J2. Meanwhile, the duct connecting portion 163b is provided so that a portion of a center axis thereof (fourth axis) J4 overlapping the duct 164 is inclined toward the first joint 162 in relation to the second axis J2.

As described above, since the second joint 163 has the same shape and size as the first joint 162, the first and second joints 162, 163 can be used interchangeably, making it easy to design the horizontal multi-joint robot 100. Specifically, angles θ1, θ2, described later, can be easily made equal, and the first and second joints 162, 163 can be arranged easily at the same height, as described below.

Also, as described above, since the duct connecting portion 162b is inclined toward the second axis J2 and the duct connecting portion 163b is inclined toward the first axis J1, the total length of the duct 164 can be restrained and the curvature of the duct can be restrained to a small value. Therefore, vibration of the duct 164 at the time when the first and second arms 120, 130 are driven or when the driving is stopped can be prevented or restrained.

The duct 164 is flexible and has two ends, that is, a first end 164a and a second end 164b. The first end 164a is connected to the duct connecting portion 162b of the first joint 162. The second end 164b is connected to the duct connecting portion 163b of the second joint 163.

The duct 164 is straight in its natural state and is connected to the first and second joints 162, 163 in a bent and deformed state. Since the duct connecting portions 162b, 163b of the first and second joints 162, 163 are inclined in relation to the first and second axes J1, J2, as described above, upward protrusion of the duct 164 can be restrained (the maximum height T in FIG. 1 can be restrained to a low value). Therefore, a small and vertically short installation space for the duct 164 suffices and the horizontal multi-joint robot 100 can be reduced in size. Also, since the upward protrusion can be restrained, the total length of the duct 164 can be restrained accordingly. Therefore, vibration of the duct 164 at the time when the first and second arms 120, 130 are driven or when the driving is stopped can be prevented or restrained.

The maximum height T may be preferably as short as possible and, for example, preferably shorter than a maximum reach height at the upper end of the spline shaft 143 (the height of the upper end in the state where the spline shaft 143 is situated the uppermost position). By employing such a height, the horizontal multi-joint robot 100 can be securely reduced in size.

An average radius of curvature R of the center axis of the duct 164 is not particularly limited. However, it is preferable that the average radius of curvature R satisfies the relation of $0.6L \leq R \leq L$, where the distance between the first axis J1 and the second axis J2 is L. By employing such an average radius of curvature R, excessive curving of the duct 164 is restrained. Therefore, the bending strength required of the duct 164 can be lowered and, for example, a reduction in weight of the duct 164 due to reduced thickness or the like can be realized.

Also, the distance L between the first and second axes J1, J2 is not particularly limited. However, it is preferable that the distance L satisfies the relation of $100 \text{ mm} \leq L \leq 2000 \text{ mm}$. By employing such a distance L, the total length of the duct 164 can be restrained and the curvature of the duct 164 can also be reduced. Moreover, the duct 164 can be effectively reduced in weight, and vibration of the duct 164 at the time when the first and second arms 120, 130 are driven or when the driving is stopped can be prevented or restrained more effectively.

Here, it is preferable that an angle $\theta 1$ formed by the center axis (third axis) J3 of the duct connecting portion 162b and the first axis J1, and an angle $\theta 2$ ($=\theta 1$) formed by the center axis (fourth axis) J4 of the duct connecting portion 163b and the second axis J2 satisfies the relation of $10° \leq \theta 1, \theta 2 \leq 60°$, more preferably $20° \leq \theta 1, \theta 2 \leq 40°$. By employing such a range of $\theta 1, \theta 2$, the maximum height T of the duct 164 can be restrained and excessive curving of the first and second joints 162, 163 can be restrained. Therefore, the curvature of the wires 170 in the curved portions 162c, 163c of the first and second joints 162, 163 can be reduced and bending stress applied to the wires 170 can be reduced. Also, since the applied bending stress is reduced, the strength required of the wires 170 is lowered accordingly. Thus, a reduction in diameter of the wires 170 and a reduction in weight due to the reduction in diameter can be realized.

Moreover, since the curvature of the duct 164 can be reduced, the bending stress applied to the duct 164 can be reduced. Also, since the applied bending stress is reduced, the strength required of the duct 164 is lowered accordingly. Thus, a reduction in thickness of the duct 164 and a reduction in weight due to the reduction in thickness can be realized.

If $\theta 1, \theta 2$ are below the above lower limit value and the distance L between the first and second axes J1, J2 is short, the duct 164 has a large curvature and processing to increase the strength of the duct 164, for example, increasing the thickness of the duct 164 or the like may be necessary. On the contrary, if $\theta 1, \theta 2$ exceed the above upper limit value, the wires 170 in the curved portions 162c, 163c of the first and second joints 162, 163 have a small curvature and processing to increase the strength of the wires 170, for example, increasing the thickness of a coating layer or the like may be necessary.

In this embodiment, the duct connecting portions 162b, 163b of the first and second joints 162, 163 are arranged at the same height. In other words, the duct connecting portions 162b, 163b are provided within the same plane as the normals of the first and second axes J1, J2. Moreover, the duct connecting portions 162b, 163b have the same slope ($\theta 1, \theta 2$), as described above. Therefore, the curvature of the duct 164 can be made substantially constant along the axial direction and the concentration of bending stress on a predetermined part of the duct 164 can be prevented or restrained. Since the part where stress concentrates tends to be the starting point of vibration, by preventing or restraining the concentration of stress, vibration of the duct 164 at the time when the first and second arms 120, 130 are driven or stopped can be prevented or restrained more effectively. Also, since the strength required of the duct 164 is lowered, a reduction in thickness of the duct 164 and a reduction weight due to the reduction in thickness can be realized.

It is preferable that the duct 164 (portions excluding the parts overlapping with the first and second joints 162, 163) extends so that the center axis thereof is along a circle (circumference) having the center axis J3 of the duct connecting portion 162b and the center axis J4 of the duct connecting portion 163b as tangents. In such a curved state, an equal bending stress is applied to substantially the entire area of the duct 164 and therefore local concentration of stress on a predetermined part of the duct 164 can be prevented more securely. Therefore, vibration of the duct 164 at the time when the first and second arms 120, 130 are driven or stopped can be prevented or restrained more securely.

Particularly, in this embodiment, since the first and second joints 162, 163 have the same shape and size, the duct connecting portions 162b, 163b can be easily arranged at the same height, for example, by equalizing the installation height of the first and second joints 162, 163. Since the first and second joints 162, 163 thus have the same shape and size, components can be made interchangeable. Thus, the manufacturing cost of the horizontal multi-joint robot 100 can be restrained and the horizontal multi-joint robot 100 can be designed easily.

The above is the description of the horizontal multi-joint robot 100.

While the duct 164 is flexible in this embodiment, the duct 164 may be rigid. As described above, the duct 164 does not substantially deform no matter how the first and second arms 120, 130 are driven. Therefore, even if the duct 164 is rigid, this does not affect the driving of the horizontal multi-joint robot 100. If the duct 164 is made of a rigid material, it is preferable that the duct 164 is made of, for example, a metallic material with environmental resistance. Thus, the horizontal multi-joint robot 100 suitable for use in a special environment is provided.

Robot

Next, a robot will be described.

Figure 3:
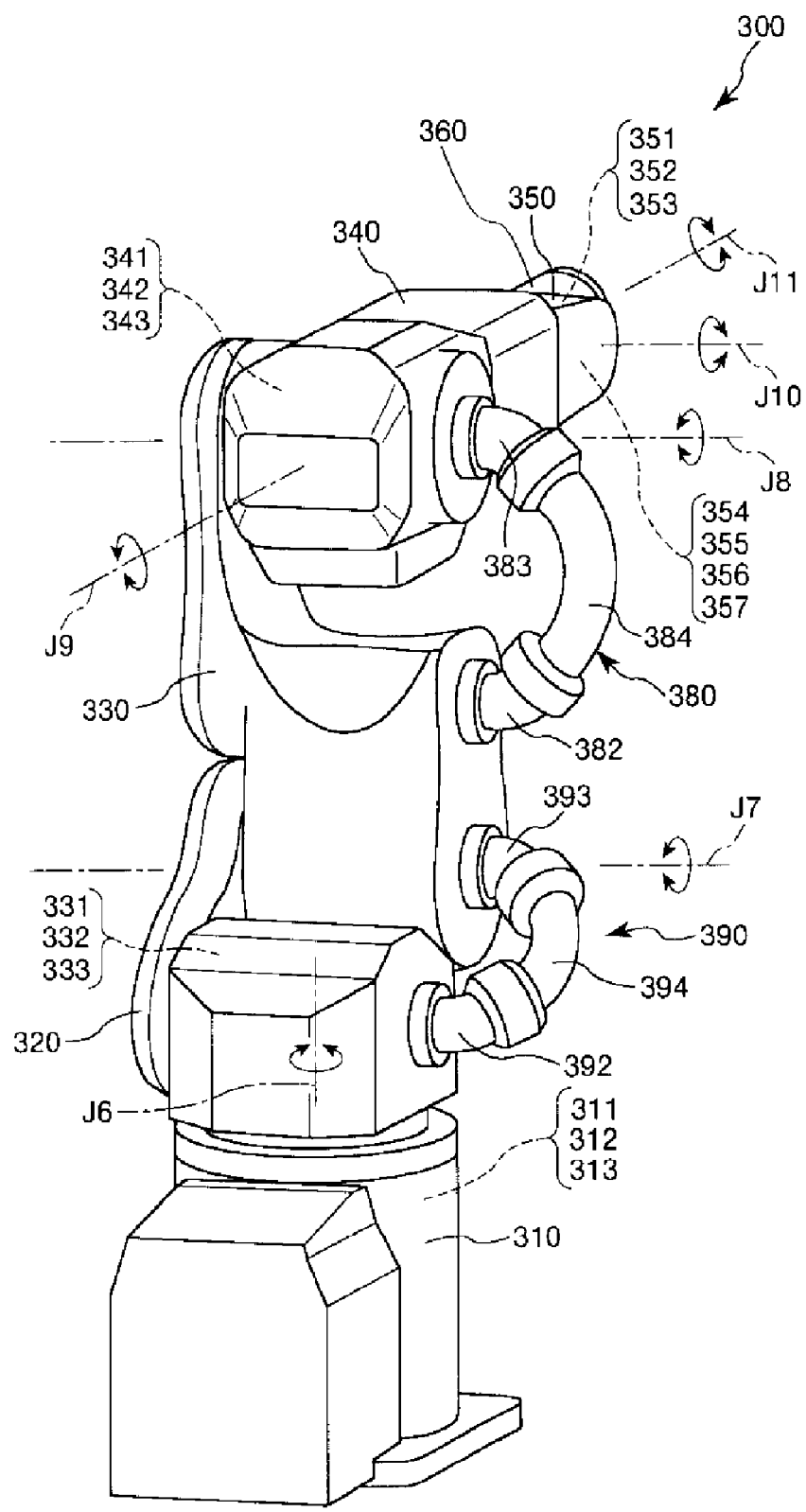
FIG. 3 is a perspective view showing a preferred embodiment of a robot.
Figure 4:
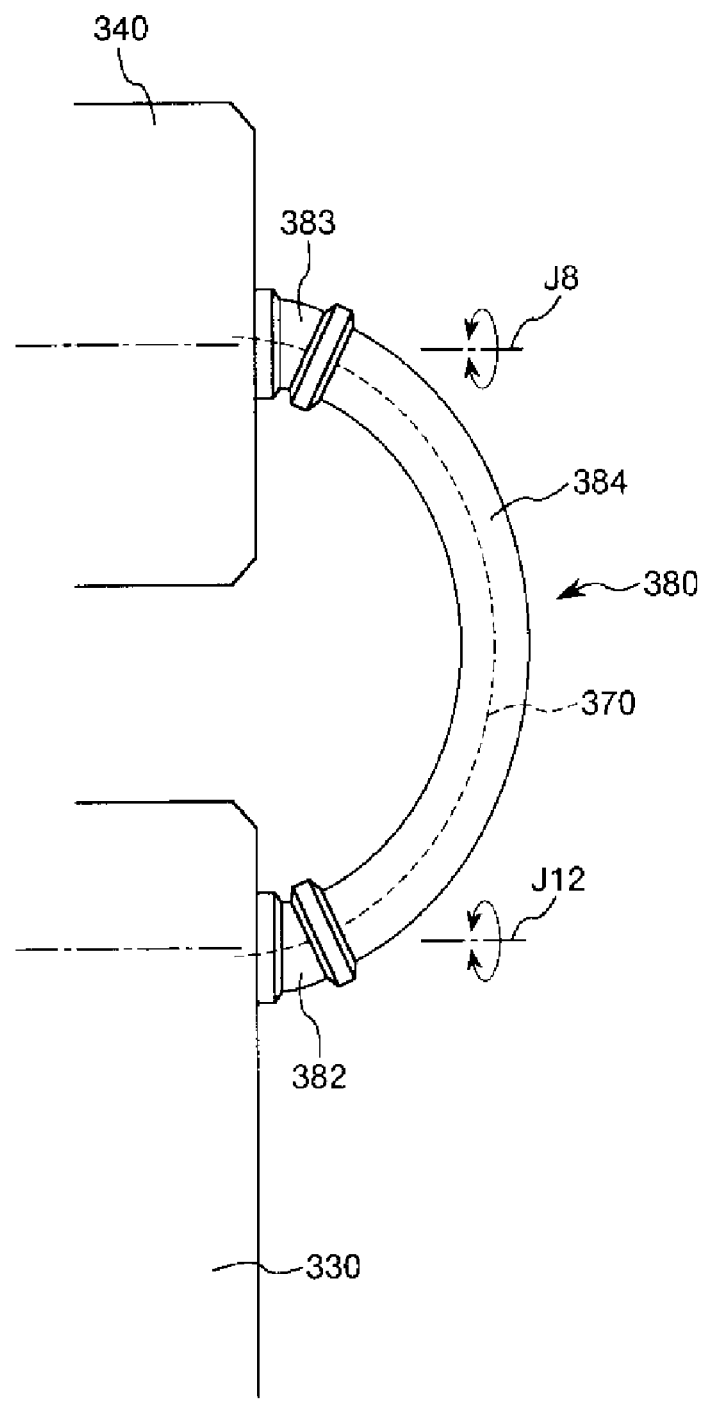
FIG. 4 is a view showing a first wiring section provided in the robot shown in FIG. 3.
Figure 5:
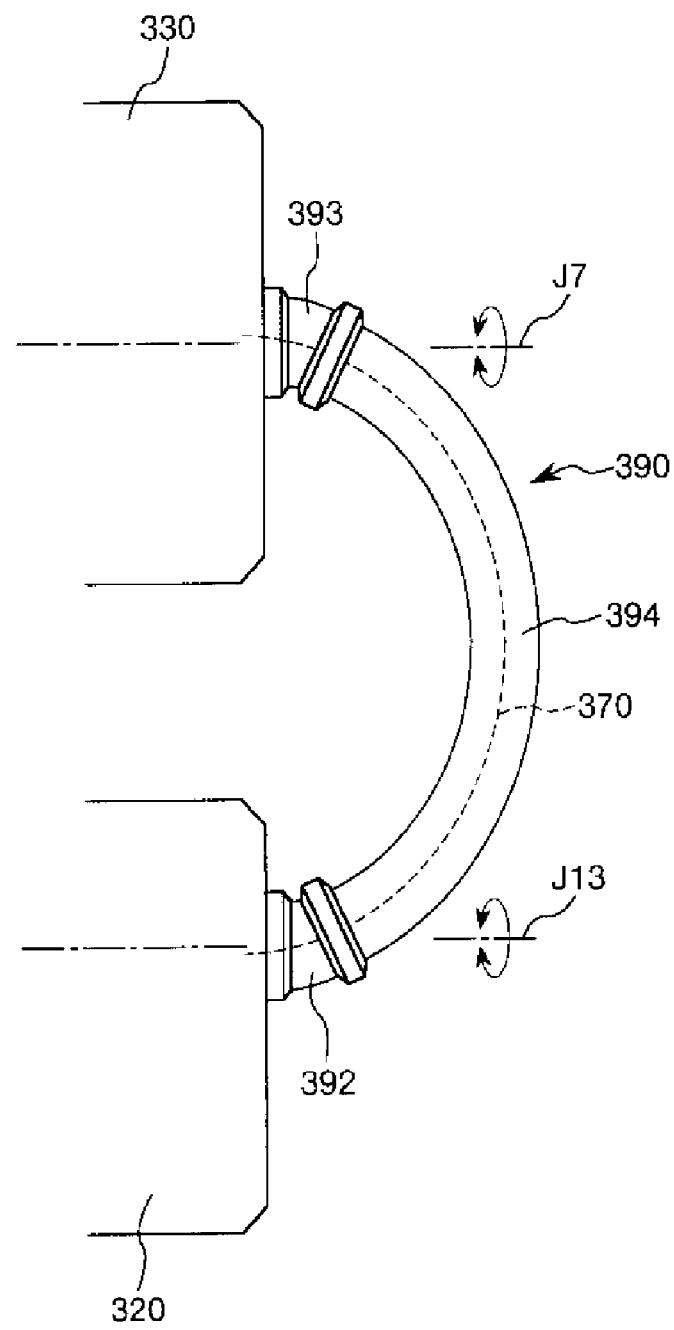
FIG. 5 is a view showing a second wiring section provided in the robot shown in FIG. 3.

FIG. 3 is a perspective view showing a preferred embodiment of a robot. FIG. 4 is a view showing a first wiring section provided in the robot shown in FIG. 3. FIG. 5 is a view showing a second wiring section provided in the robot shown in FIG. 3.

A robot 300 shown in FIG. 3 is a vertical multi-joint (six-axis) robot having a pedestal 310, four arms 320, 330, 340, 350, and a wrist 360 that are connected in order.

The pedestal 310 is fixed, for example, to a floor surface which is not shown in the drawing with bolts or the like. The arm 320 with an attitude inclined in relation to horizontal direction is connected to an upper end of such a pedestal 310. The arm 320 is capable of swiveling around an axis J6 that extends along a vertical direction in relation to the pedestal 310.

Inside the pedestal 310, a first motor 311 which causes the arm 320 to swivel, and a first decelerator 312 are installed. Although not shown, an input axis of the first decelerator 312 is connected to a rotation axis of the first motor 311, and an output axis of the first decelerator 312 is connected to the arm 320. Therefore, when the first motor 311 is driven and a driving force thereof is transmitted to the arm 320 via the first decelerator 312, the arm 320 swivels within a horizontal plane around the axis J6 in relation to the pedestal 310. The first motor 311 is provided with a first encoder 313 which outputs a pulse signal corresponding to the amount of rotation of the first motor 311. Based on the pulse signal from the first encoder 313, the amount of swiveling of the arm 320 in relation to the pedestal 310 can be detected.

The arm 330 is connected to a distal end of the arm 320. The arm 330 is capable of swiveling around an axis J7 that extends along a horizontal direction in relation to the arm 320.

Inside the arm 330, a second motor 331 which causes the arm 330 to swivel in relation to the arm 320, and a second decelerator 332 are installed. Although not shown, an input axis of the second decelerator 332 is connected to a rotation axis of the second motor 331, and an output axis of the second decelerator 332 is connected and fixed to the arm 320. Therefore, when the second motor 331 is driven and a driving force thereof is transmitted to the arm 320 via the second decelerator 332, the arm 330 swivels within a horizontal plane around the axis J7 in relation to the arm 320. The second motor 331 is provided with a second encoder 333 which outputs a pulse signal corresponding to the amount of rotation of the second motor 331. Based on the pulse signal from the second encoder 333, the driving (amount of swiveling) of the arm 330 in relation to the arm 320 can be detected.

The arm 340 is connected to a distal end of the arm 330. The arm 340 is capable of swiveling around an axis J8 that extends along a horizontal direction in relation to the arm 330.

Inside the arm 340, a third motor 341 which causes the arm 340 to swivel in relation to the arm 330, and a third decelerator 342 are installed. Although not shown, an input axis of the third decelerator 342 is connected to a rotation axis of the third motor 341, and an output axis of the third decelerator 342 is connected and fixed to the arm 330. Therefore, when the third motor 341 is driven and a driving force thereof is transmitted to the arm 330 via the third decelerator 342, the arm. 340 swivels within a horizontal plane around the axis J8 in relation to the arm. 330. The third motor 341 is provided with a third encoder 343 which outputs a pulse signal corresponding to the amount of rotation of the third motor 341. Based on the pulse signal from the third encoder 343, the driving (amount of swiveling) of the arm 340 in relation to the arm 330 can be detected.

The arm 350 is connected to a distal end of the arm 340. The arm 350 is capable of swiveling around an axis J9 that extends along a center axis of the arm 340 in relation to the arm 340.

Inside the arm 350, a fourth motor 351 which causes the arm 350 to swivel in relation to the arm 340, and a fourth decelerator 352 are installed. An input axis of the fourth decelerator 352 is connected to a rotation axis of the fourth motor 351, and an output axis of the fourth decelerator 352 is connected and fixed to the arm 340. Therefore, when the fourth motor 351 is driven and a driving force thereof is transmitted to the arm 340 via the fourth decelerator 352, the arm 350 swivels within a horizontal plane around the axis J9 in relation to the arm 340. The fourth motor 351 is provided with a fourth encoder 353 which outputs a pulse signal corresponding to the amount of rotation of the fourth motor 351.

Based on the pulse signal from the fourth encoder 353, the driving (amount of swiveling) of the arm 350 in relation to the arm 340 can be detected.

The wrist 360 is connected to a distal end of the arm 350. The wrist 360 has a ring-shaped support ring connected to the arm 350, and a cylindrical wrist main body supported on a distal end of the support ring. A distal end surface of the wrist main body is a flat surface and serves, for example, as a mounting surface where a manipulator holding a precision device such as a wristwatch is mounted.

The support ring is capable of swiveling around an axis J10 that extends along a horizontal direction in relation to the arm 350. The wrist main body is capable of swiveling around an axis J11 that extends along a center axis of the wrist main body in relation to the support ring.

Inside the arm 350, a fifth motor 354 which causes the support ring to swivel in relation to the arm 350, and a sixth motor 355 which causes the wrist main body to swivel in relation to the support ring are arranged. Driving forces of the fifth and sixth motors 354, 355 are transmitted to the support ring and the wrist main body, respectively, by a driving force transmission mechanism, not shown. The fifth motor 354 is provided with a fifth encoder 356 which outputs a pulse signal corresponding to the amount of rotation of the fifth motor 354. Based on the pulse signal from the fifth encoder 356, the amount of swiveling of the support ring in relation to the arm 350 can be detected. Also, the sixth motor 355 is provided with a sixth encoder 357 which outputs a pulse signal corresponding to the amount of rotation of the sixth motor 355. Based on the pulse signal from the sixth encoder 357, the amount of swiveling of the wrist main body in relation to the support ring can be detected.

Plural wires 370 connected to individual electronic components (for example, third, fourth, fifth and sixth motors 341, 351, 354, 355, third, fourth, fifth and sixth encoders 343, 353, 356, 357 and the like) arranged insides the arms 340, 350 pass through a pipe-like first wiring section 380 connecting the arm 340 and the arm 330 to each other and are drawn into the arm 340. Also, the plural wires 370 pass through a pipe-like second wiring section 390 connecting the arm 330 and the arm 320 to each other and are drawn into the arm 320. Moreover, the plural wires 370 are bundled inside the arm 320 and thus drawn to the pedestal 310 together with wires connected to the second motor 331 and the second encoder 333. The wires are then bundled inside the pedestal 310 and thus drawn up to a control device, not shown, which is installed outside the pedestal 310 and generally controls the robot 300, along with the wires connected to the first motor 311 and the first encoder 313.

Since the wires 370 of the individual electronic components inside the arms 340, 350 are thus drawn into the pedestal 310 via the first and second wiring sections 380, 390, a large space for drawing the wires 370 need not be secured within the arms 320, 330. Therefore, as in the foregoing horizontal multi-joint robot 100, a reduction in the size and weight of the robot 300 can be realized.

As shown in FIG. 4, the first wiring section 380 has a first joint 382, a second joint 383, and a duct 384. These components are connected in order of the first joint 382, the duct 384, and the second joint 383, from the side of the arm 330. A wire insertion hole (not shown) which connects the insides of the arm 330 and the arm 340 to each other is formed within the first wiring section 380. That is, the first joint 382, the second joint 383, and the duct 384 are all pipe-shaped and have open inner spaces thereof connected in series.

The first joint 382 is received by a bearing on the arm 330 and is capable of swiveling around an axis J12 in relation to the arm 330. Meanwhile, the second joint 383 is received by a bearing on the arm 340 and is capable of swiveling around the axis J8 in relation to the arm 340. The axis J12 is parallel to the axis J8. Therefore, no matter how the arm 340 is driven in relation to the arm 330, a distance between the axes of the first and second joints 382, 383 is kept constant. Therefore, deformation (expansion or contraction) of the duct 384 connected at both ends to the first and second joints 382, 383 is prevented or restrained. Consequently, vibration of the duct 384 at the time when the arm 340 is driven or when the driving is stopped can be prevented or restrained.

The first joint 382, the second joint 383 and the duct 384 have similar configurations to the first joint 162, the second joint 163 and the duct 164 of the foregoing horizontal multi-joint robot 100, respectively, and therefore will not be described further in detail. Also, with respect to the first wiring section 380, the arm 330, the arm 340, the axis J12 and the axis J8 are equivalent to the first arm, the second arm, the first axis and the second axis described in the appended claims, respectively.

As shown in FIG. 5, the second wiring section 390 has a first joint 392, a second joint 393, and a duct 394. These components are connected in order of the first joint 392, the duct 394, and the second joint 393, from the side of the arm 320. A wire insertion hole (not shown) which connects the insides of the arm 320 and the arm 330 to each other is formed within the second wiring section 390. That is, the first joint 392, the second joint 393, and the duct 394 are all pipe-shaped and have open inner spaces thereof connected in series.

The first joint 392 is received by a bearing on the arm 320 and is capable of swiveling around an axis J13 in relation to the arm 320. Meanwhile, the second joint 393 is received by a bearing on the arm 330 and is capable of swiveling around the axis J7 in relation to the arm 330. The axis J13 is parallel to the axis J7. Therefore, no matter how the arm 330 is driven in relation to the arm 320, a distance between the axes of the first and second joints 392, 393 is kept constant. Therefore, deformation (expansion or contraction) of the duct 394 connected at both ends to the first and second joints 392, 393 is prevented or restrained. Consequently, vibration of the duct 394 at the time when the arm 330 is driven or when the driving is stopped can be prevented or restrained.

The first joint 392, the second joint 393 and the duct 394 have similar configurations to the first joint 382, the second joint 383 and the duct 384, respectively, and therefore will not be described further in detail. Also, with respect to the second wiring section 390, the arm 320, the arm 320, the axis J13 and the axis J7 are equivalent to the first arm, the second arm, the first axis and the second axis described in the appended claims, respectively.

The above is the description of the robot 300.

A horizontal multi-joint robot and a robot are described above, based on the illustrated embodiments. However, the invention is not limited to these embodiments and the configuration of each part can be replaced by an arbitrary configuration having similar functions. Also, other arbitrary components may be added within the scope of the invention.

The entire disclosure of Japanese Patent Application No. 2012-233499 filed Oct. 23, 2012 is hereby expressly incorporated by reference herein.

What is claimed is:

1. A horizontal multi-joint robot comprising:
a first joint that is rotatable around a first axis;
a second joint that is rotatable around a second axis, the second axis being parallel to and spaced apart from the first axis; and
a duct connected between the first joint and the second joint;
wherein the first joint has a first connecting portion positioned at a first incline relative to the first axis,
the second joint has a second connecting portion positioned at a second incline relative to the second axis, and
the duct has a first end and a second end, the first end being connected to the first connecting portion, and the second end being connected to the second connecting portion.

2. The horizontal multi-joint robot according to claim 1, wherein a duct connecting portion of the first joint and a duct connecting portion of the second joint are provided within the same plane as normals of the first axis and the second axis.

3. The horizontal multi-joint robot according to claim 1, wherein an angle formed by the first axis and a center axis of the first connecting portion is equal to an angle formed by the second axis and a center axis of the second connecting portion.

4. The horizontal multi-joint robot according to claim 1, wherein an angle formed by the first axis and a center axis of the first connecting portion is 10° or more and 60° or less, and an angle formed by the second fourth axis and a center axis of the second connecting portion is 10° or more and 60° or less.

5. The horizontal multi-joint robot according to claim 1, wherein the first joint and the second joint have the same shape and size.

6. The horizontal multi-joint robot according to claim 1, wherein the duct extends along a circle having both a center axis of the first connecting portion and a center axis of the second connecting portion as tangents.

7. The horizontal multi-joint robot according to claim 1, wherein an average radius of curvature of the duct is equal to or short than a distance between the first axis and the second axis, and the average radius is equal to or long than a length 0.6 times the distance.

8. The horizontal multi-joint robot according to claim 1, wherein a distance between the first axis and the second axis is 100 mm or more and 2000 mm or less.

9. A robot comprising:
a pedestal;
a first arm connected to the pedestal and being rotatable around a first axis relative to the pedestal;
a second arm connected to the first arm and being rotatable around a second axis that is parallel to and spaced apart from the first axis; and
a wiring section which accommodates a wire therein, the wire extending from the second arm to the pedestal,
wherein the wiring section includes:
a duct supporting portion that protrudes from the pedestal and intersects the first axis;
a first joint connected to the duct supporting portion and being rotatable around the first axis relative to the duct supporting portion;
a second joint connected to the second arm and being rotatable around the second axis relative to the second arm; and
a duct connected between the first joint and the second joint,
wherein the first joint has a first connecting portion located at a first incline relative to the first axis,
the second joint has a second connecting portion located at a second incline relative to the second axis, and
the duct has a first end and a second end, the first end being connected to the first connecting portion, and the second end being connected to the second connecting portion.

10. A robot comprising:
a pedestal;

a first arm rotatably connected to the pedestal about a first axis;

a second arm rotatably connected to the first arm about a second axis parallel to and spaced apart from the first axis; and a wiring section accommodating a wire therein that extends from the second arm to the pedestal, wherein the wiring section includes:

a duct supporting portion protruding from the pedestal;

a first joint connected to the duct supporting portion and being rotatable around the first axis relative to the duct supporting portion;

a second joint connected to the second arm and being rotatable around the second axis relative to the second arm; and a duct connected between the first joint and the second joint, wherein the first joint has a first connecting portion inclined relative to the first axis, the second joint has a second connecting portion inclined relative to the second axis, and the duct has a first end connected to the first connecting portion, and a second end connected to the second connecting portion.

11. The robot according to claim 10, wherein the first and second connecting portions are inclined at equal angles.

12. The robot according to claim 10, wherein an upper surface of the duct supporting section is substantially coplanar with an upper surface of the second arm.

13. The robot according to claim 10, wherein the duct curves along a circular arc between the first and second connecting portions.

\* \* \* \* \*